3,117,991
PREPARATION OF FUMARIC ACID BY HEATING MALIC ACID WITH MALEIC ANHYDRIDE
Rex E. Lidov, Great Neck, and Harry Olenberg, Bronx, N.Y., assignors to Halcon International, Inc., a corporation of Delaware
No Drawing. Filed July 29, 1960, Ser. No. 46,053
4 Claims. (Cl. 260—537)

This invention relates to a process for preparing fumaric acid, more particularly to a process for converting malic acid to fumaric acid, and especially to such a process wherein a mixture of malic acid with maleic anhydride is heated in an inert atmosphere at a temperature in the range of about 100° to 190° C., under which conditions the malic acid is substantially converted to fumaric acid.

In the production of fumaric acid from maleic anhydride by isomerization of an aqueous solution thereof at elevated temperatures, malic acid is formed as a by-product. The art is confronted by the problem of retrieving the potential fumaric acid, thus lost as malic acid, especially in an economically feasible and advantageous manner.

The discoveries associated with the invention relating to solutions of the above problems and the objects achieved in accordance with the invention as described herein include the provision of:

A process for preparing fumaric acid which comprises heating a mixture of malic acid and maleic anhydride in an inert atmosphere at a temperature in the range of 100° to 190° C., whereby malic acid is converted to fumaric acid;

Such processes wherein the composition of the initial mixture is in the range of 5 parts of malic acid per 95 parts of pure maleic anhydride, to 80 parts malic acid per 20 parts of the anhydride;

Such processes wherein the inert atmosphere is nitrogen;

Such processes wherein the reaction time is in the range of 10 min. to 3 hours; and any other objects which will be apparent as details or embodiments of the invention are set forth hereinafter.

In order to indicate still more fully the nature of the present invention, the following examples of typical procedures are set forth, in which parts and percent mean part and percent by weight, respectively, it being understood that these examples are presented as illustrative only and are not intended to limit the scope of the invention.

*Example 1*

A malic acid feedstock may be obtained from the filtrate or liquors produced during the aqueous, non-catalytic, elevated temperature isomerization of maleic acid to fumaric acid after the solid fumaric acid is separated from the mixture, e.g. by filtration. The filtrate or liquors may be a water white malic acid solution, and this may be concentrated by evaporation, and cooled to precipitate malic acid. The solid malic acid may be removed by filtration or in any equivalent manner.

A reaction vessel having a glass inner surface is charged with 62 parts of malic acid and 124 parts of pure maleic anhydride, and is heated to and maintained at a temperature of 175° C. for three hours under dehydration conditions (contents being maintained under a nitrogen blanket and also under vigorous agitation). Then the reaction mixture is brought to a temperature of 75° C. to separate solid fumaric acid product. The filter cake is washed with water to remove residual maleic anhydride. The yield of fumaric acid corresponds to 111 mol percent based on the malic acid charged (the yield over 100 mol percent is due to partial hydration of part of the maleic anhydride present, and its isomerization to fumaric acid).

Comparable results to the foregoing may be achieved with various modifications thereof, including the following. The composition of the initial reaction mixture may be in the range of 5 parts by weight of malic acid per 95 parts of pure maleic anhydride to 80 parts of malic acid per 20 parts of maleic anhydride. The reaction temperature may be in the range of about 100 to 190° C., desirably 110 to 180, and preferably 115 to 175° C.

In accordance with the invention, high overall conversion of maleic acid to fumaric acid is achieved, with minimal capital cost requirements, and with elimination of the need to recycle and store malic acid which deteriorates rather readily.

In view of the foregoing disclosure, variations and modifications thereof will be apparent to one skilled in the art, and it is intended to include within the invention all such variations and modifications except as do not come within the scope of the appended claims.

What is claimed is:

1. A process for preparing fumaric acid which comprises: heating a mixture of malic acid and maleic anhydride at a temperature in the range of 100 to 190° C., in an inert atmosphere and forming fumaric acid in an amount greater than the molar equivalent of malic acid in said mixture.

2. A process of claim 1 wherein the composition of the initial mixture is in the range of 5 parts of malic acid per 95 parts of pure maleic anhydride to 80 parts malic acid per 20 parts of the anhydride.

3. A process of claim 1 wherein the inert atmosphere is nitrogen.

4. A process of claim 2 wherein the reaction time is in the range of 10 min. to 3 hours.

References Cited in the file of this patent
UNITED STATES PATENTS
2,441,238   Dunlop _____ May 11, 1948
OTHER REFERENCES
Rodd et al.: "Chemistry of Carbon Compounds," (1952) vol. 1(b) pp. 989–993 and 1104.